US012721780B1

(12) United States Patent
Su et al.

(10) Patent No.: US 12,721,780 B1
(45) Date of Patent: Sep. 1, 2026

(54) SEXUAL STIMULATION DEVICE

(71) Applicant: DONGGUAN YANSHI ELECTRONIC TECHNOLOGY CO., LTD., Dongguan (CN)

(72) Inventors: Yanyan Su, Hefei (CN); Wenqiang Wu, Jingzhou (CN)

(73) Assignee: Dongguan Yanshi Electronic Technology Co., Ltd., Dongguan (CN)

( * ) Notice: Subject to any disclaimer, the term of this patent is extended or adjusted under 35 U.S.C. 154(b) by 0 days.

(21) Appl. No.: 19/422,462

(22) Filed: Dec. 17, 2025

(30) Foreign Application Priority Data

Sep. 30, 2025 (CN) ........................ 202511429636.2

(51) Int. Cl.
*A61H 19/00* (2006.01)
*A61H 23/02* (2006.01)

(52) U.S. Cl.
CPC ......... *A61H 19/32* (2013.01); *A61H 23/0254* (2013.01); *A61H 2201/0207* (2013.01); *A61H 2201/0214* (2013.01); *A61H 2201/0242* (2013.01); *A61H 2201/025* (2013.01); *A61H 2201/0285* (2013.01); *A61H 2201/1695* (2013.01); *A61H 2205/087* (2013.01)

(58) Field of Classification Search
CPC ........ A61H 19/00; A61H 19/30; A61H 19/32; A61H 19/50; A61H 23/02; A61H 23/0254; A61H 23/0263; A61H 2023/0272; A61H 2023/0281; A61H 2023/029
See application file for complete search history.

(56) References Cited

FOREIGN PATENT DOCUMENTS

| | | | | |
|---|---|---|---|---|
| CN | 122137851 | * | 12/2020 | ............ A61H 19/30 |
| CN | 220002310 U | | 11/2023 | |
| CN | 220938508 U | | 5/2024 | |
| CN | 222899437 U | | 5/2025 | |
| WO | WO2014127731 | * | 8/2014 | ............ A61H 19/32 |

* cited by examiner

*Primary Examiner* — Carrie R Dorna
(74) *Attorney, Agent, or Firm* — Ming Jiang; OPENPTO US LLC

(57) ABSTRACT

A sexual stimulation device includes a housing, a flexible inner container, and a cold-heat generation assembly. The housing includes an accommodating cavity, and the accommodating cavity has a first opening. The flexible inner container is provided with a second opening for insertion of a penis, the flexible inner container is provided with a massage structure, the massage structure provides massage stimulation to the penis, the flexible inner container is disposed in the accommodating cavity, and the second opening corresponds to the first opening. The cold-heat generation assembly includes a heat conducting member and a refrigeration and heating member, the heat conducting member wraps the flexible inner container, the heat conducting member is in contact with the flexible inner container, and the refrigeration and heating member is in contact with the heat conducting member; and the refrigeration and heating member performs heat exchange with the flexible inner container.

20 Claims, 9 Drawing Sheets

SEXUAL STIMULATION DEVICE

CROSS-REFERENCE OF RELATED APPLICATION

The present application claims priority to Chinese Patent Application No. 202511429636.2 filed on Sep. 30, 2025, which is incorporated herein by reference in its entirety.

TECHNICAL FIELD

The present disclosure relates to the technical field of sex toys, and in particular to a sexual stimulation device.

BACKGROUND

An embedded massager is a device capable of providing massage stimulation to an inserted penis, and due to a capability to fully wrap the penis, a good massage stimulation effect is achieved. However, with the improvement of people's living standards, people have an increasing demand for more diverse functions of embedded massagers. For example, hot compress and other functions may be achieved while meeting basic massage stimulation needs.

To solve the technical problem that an embedded massager achieves hot compress while meeting the basic massage needs, a heating assembly composed of heating resistance wires wound around an outer wall of a massage inner container of the embedded massager is generally arranged to heat the massage inner container, so as to achieve the function of hot compress. However, since the heating resistance wires are wound around the outer wall of the massage inner container, there exist gaps between the heating resistance wires. Due to the existence of the gaps, the heating assembly is not in full contact with the outer wall of the massage inner container, thereby reducing an effective contact area between the heating assembly and the massage inner container, and reducing the thermal conduction efficiency between the heating assembly and the massage inner container, such the user experience is compromised due to a long time for the massage inner container to reach a preset temperature.

SUMMARY

A sexual stimulation device is provided in the embodiments of the present disclosure, which improves the massage stimulation effect of the sexual stimulation device and further enhances the user experience.

In a first aspect, a sexual stimulation device is provided in an embodiment of the present disclosure, including a housing, a flexible inner container, and a cold-heat generation assembly. The housing includes an accommodating cavity, and the accommodating cavity has a first opening. An end of the flexible inner container is provided with a second opening for insertion of a penis, an inner wall of the flexible inner container is provided with a massage structure, the massage structure provides massage stimulation to the penis, the flexible inner container is disposed in the accommodating cavity, and a position of the second opening corresponds to a position of the first opening. The cold-heat generation assembly includes a heat conducting member and a refrigeration and heating member, the heat conducting member wraps an outer wall of the flexible inner container, the heat conducting member is in contact with the outer wall of the flexible inner container, and the refrigeration and heating member is in contact with a side of the heat conducting member away from the flexible inner container; and the refrigeration and heating member performs heat exchange with the flexible inner container through the heat conducting member such that the flexible inner container reaches a preset temperature, and the preset temperature is a temperature required for the penis.

In the above technical solution, the heat conducting member wraps the flexible inner container and is in contact therewith, such that the flexible inner container quickly reaches the preset temperature, the surface temperature distribution is more uniform, and the flexible inner container provides good stimulation of hot compress or cold compress to the penis; additionally, when the flexible inner container deforms, the flexible inner container arranged better fits the skin of the penis, such that the flexible inner container better provides hot compress, cold compress, massage, and other stimulations to the penis; and therefore, the cooperation between the heat conducting member, the refrigeration and heating member, and the flexible inner container integrally improves a massage effect of the sexual stimulation device and enhances the user experience.

In some embodiments, an air cooling assembly is further included, and the air cooling assembly includes a fan, a heat dissipation member, and an airflow channel, where one end of the airflow channel communicates with the refrigeration and heating member, the other end of the airflow channel communicates with an exterior of the housing, the fan and the heat dissipation member are disposed in the airflow channel, one side of the heat dissipation member is connected to the refrigeration and heating member, and the other side of the heat dissipation member is connected to the fan.

In some embodiments, the housing includes a first housing held by the user and a second housing not held by the user, the second housing is provided with a ventilation hole, and the ventilation hole communicates with the airflow channel.

In some embodiments, a dustproof net is further disposed on the ventilation hole.

In some embodiments, a plurality of ventilation holes are formed, the plurality of ventilation holes are uniformly distributed on the second housing, and diameters of the ventilation holes range from 0.5 mm to 1.5 mm.

In some embodiments, the refrigeration and heating member is a semiconductor chilling plate, and the heat conducting member is an aluminum sheet or a copper sheet.

In some embodiments, the heat conducting member includes a plurality of first components and a plurality of second components, the plurality of first components and the plurality of second components are intercrossedly arranged to form a mesh structure, and first deformation spaces for the deformation of the flexible inner container are formed in the mesh structure.

In some embodiments, the heat conducting member includes a first main body part in contact with the refrigeration and heating member and a second main body part not in contact with the refrigeration and heating member, the second main body part includes a plurality of third components arranged at intervals along an outer periphery of the flexible inner container, and a second deformation space for the deformation of the flexible inner container is formed between two adjacent third components among the plurality of third components.

In some embodiments, a first vibration motor is further included, the first vibration motor is disposed in the second deformation space, and the first vibration motor drives the flexible inner container to vibrate.

In some embodiments, a first airbag and a first air pump are further included, the first airbag communicates with the first air pump, the first airbag is disposed in the second deformation space, and the first air pump controls the expansion or contraction of the first airbag to deform the flexible inner container.

In some embodiments, the flexible inner container includes a first flexible main body part and a second flexible main body part sequentially arranged in a thickness direction of the flexible inner container, and a Shore hardness of the first flexible main body part is greater than a Shore hardness of the second flexible main body part.

In some embodiments, the flexible inner container is made of a flexible material, and the flexible material is one or more of TPE, POE, silicone, and liquid silicone.

In some embodiments, the inner wall of the flexible inner container is provided with a plurality of massage structures, the plurality of massage structures are arranged at intervals in the height direction Y of the flexible inner container, and each of the massage structures includes a plurality of first protrusions arranged at intervals along an inner periphery of the flexible inner container.

In some embodiments, the inner wall of the flexible inner container is provided with a plurality of massage structures, the plurality of massage structures are arranged at intervals in the height direction of the flexible inner container, and each of the massage structures includes second protrusions extending uninterruptedly along the inner periphery of the flexible inner container.

In some embodiments, the massage structure has a thickness of T1, where 1 mm≤T1≤5 mm.

In a second aspect, a sexual stimulation device is provided in an embodiment of the present disclosure, including a housing, a flexible inner container, a cold-heat generation assembly, and a second vibration motor. The housing includes an accommodating cavity, and the accommodating cavity has a first opening. An end of the flexible inner container is provided with a second opening for insertion of a penis, an inner wall of the flexible inner container is provided with a massage structure, the massage structure provides massage stimulation to the penis, the flexible inner container is disposed in the accommodating cavity, and a position of the second opening corresponds to a position of the first opening; the flexible inner container is provided with a first massage portion in contact with the glans of the penis and a second massage portion not in contact with the glans of the penis. The cold-heat generation assembly includes a heat conducting member and a refrigeration and heating member, the heat conducting member wraps an outer wall of the first massage portion, the heat conducting member is in contact with the outer wall of the first massage portion, and the refrigeration and heating member is in contact with a side of the heat conducting member away from the first massage portion. The second vibration motor is disposed on an outer wall of the second massage portion. The refrigeration and heating member performs heat exchange with the first massage portion through the heat conducting member until the first massage portion reaches a preset temperature, the preset temperature is a temperature required for the glans, and the second vibration motor drives the second massage portion to vibrate.

In some embodiments, a plurality of second vibration motors are included, and the plurality of second vibration motors are uniformly arranged along an outer periphery of the second massage portion.

In some embodiments, the refrigeration and heating member is a semiconductor chilling plate, and the heat conducting member is an aluminum sheet or a copper sheet.

In some embodiments, an air cooling assembly is further included, and the air cooling assembly includes a fan, a heat dissipation member, and an airflow channel, where one end of the airflow channel communicates with the refrigeration and heating member, the other end of the airflow channel communicates with an exterior of the housing, the fan and the heat dissipation member are disposed in the airflow channel, one side of the heat dissipation member is connected to the refrigeration and heating member, and the other side of the heat dissipation member is connected to the fan.

In some embodiments, the housing includes a first housing held by the user and a second housing not held by the user, the second housing is provided with a ventilation hole, and the ventilation hole communicates with the airflow channel.

BRIEF DESCRIPTION OF THE DRAWINGS

To describe the technical solutions in the embodiments of the present disclosure more clearly, the accompanying drawings required for describing the embodiments are briefly described below. It is to be understood that the following accompanying drawings show merely some embodiments of the present disclosure, and therefore it is not to be construed as a limitation to the scope. Those of ordinary skill in the art can also derive other accompanying drawings from these accompanying drawings without making inventive efforts.

Figure 1:
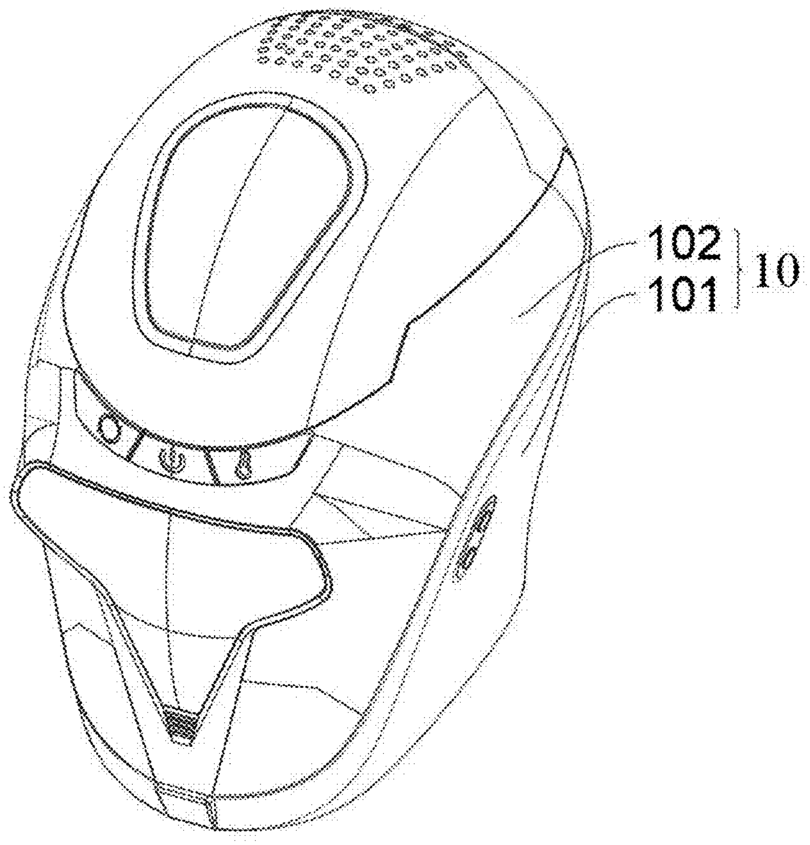
FIG. 1 is a schematic structural diagram of a sexual stimulation device provided in some embodiments of the present disclosure.

Reference numerals in the figures:

10—housing, 101—first housing, 102—second housing, 1021—ventilation hole, 1022—dustproof net, 11—accommodating cavity, 111—first opening, 12—flexible inner container, 121—massage structure, 1211—first protrusion, 1212—second protrusion, 122—first massage portion, 123—second massage portion, 124—second vibration motor, 125—first flexible main body part, 126—second flexible main body part, 127—second opening, 13—cold-heat generation assembly, 131—heat conducting member, 1311—first component, 1312—second component, 1313—first deformation space, 1314—first main body part, 1315—second main body part, 1316—third component, 1317—second deformation space, 1318—first vibration motor, 1319—first airbag, 1320—first air pump, 132—refrigeration and heating member, 14—air cooling assembly, 141—fan, 142—heat dissipation member, 143—airflow channel, X—thickness direction, and Y—height direction.

DETAILED DESCRIPTION OF PREFERRED EMBODIMENTS

In order to make the objectives, technical solutions and advantages of the embodiments of the present disclosure clearer, the technical solutions in the embodiments of the present disclosure will be clearly and completely described below in combination with the accompanying drawings in the embodiments of the present disclosure. Apparently, the embodiments described are merely some rather than all of the embodiments of the present disclosure. Based on the embodiments of the present disclosure, all other embodiments acquired by those of ordinary skill in the art without making creative efforts fall within the scope of protection of the present disclosure.

Unless defined otherwise, all technical and scientific terms used herein have the same meanings as commonly understood by those skilled in the art to which the present disclosure belongs. The terms used in the specification of the present disclosure are for the purpose of describing specific embodiments merely and are not intended to limit the present disclosure. The terms "including" and "having", and any variations thereof in the specification, the claims and the above accompanying drawings are intended to cover non-exclusive inclusion. The terms "first", "second" and the like in the specification and the claims or the above accompanying drawings are used to distinguish different objects and are not intended to indicate a specific order or hierarchical relationship.

When the term "embodiment" is referred to herein, it means that specific features, structures or characteristics described in combination with the embodiment are included in at least one embodiment of the present disclosure. When this phrase occurs at various positions in the specification, it neither necessarily refers to the same embodiment, nor refers to an independent or alternative embodiment mutually exclusive to other embodiments. Those skilled in the art understand both explicitly and implicitly that the embodiments described herein can be combined with other embodiments.

In the description of the present disclosure, it is to be noted that, unless otherwise explicitly specified and defined, the terms "mounting", "connected", "connecting" and "attaching" are to be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the present disclosure may be understood according to specific circumstances.

The term "and/or" in the present disclosure, which is merely an association relation describing an associated object, means that there maybe exist three relations, for example, A and/or B maybe represent three situations: A exists alone, A and B exist at the same time, and B exists alone. In addition, the character "/" mentioned in the present disclosure generally indicates that the associated objects are in an "or" relationship.

In the embodiments of the present disclosure, the same reference numerals denote the same components, and for the sake of brevity, the detailed description of the same components is omitted in different embodiments. It should be understood that thicknesses, lengths, widths, and other dimensions of various components shown in the accompanying drawings of the embodiments of the present disclosure, as well as an overall thickness, length, width and other dimensions of an integrated device, are only exemplary and should not constitute any limitation to the present disclosure.

Figure 2:
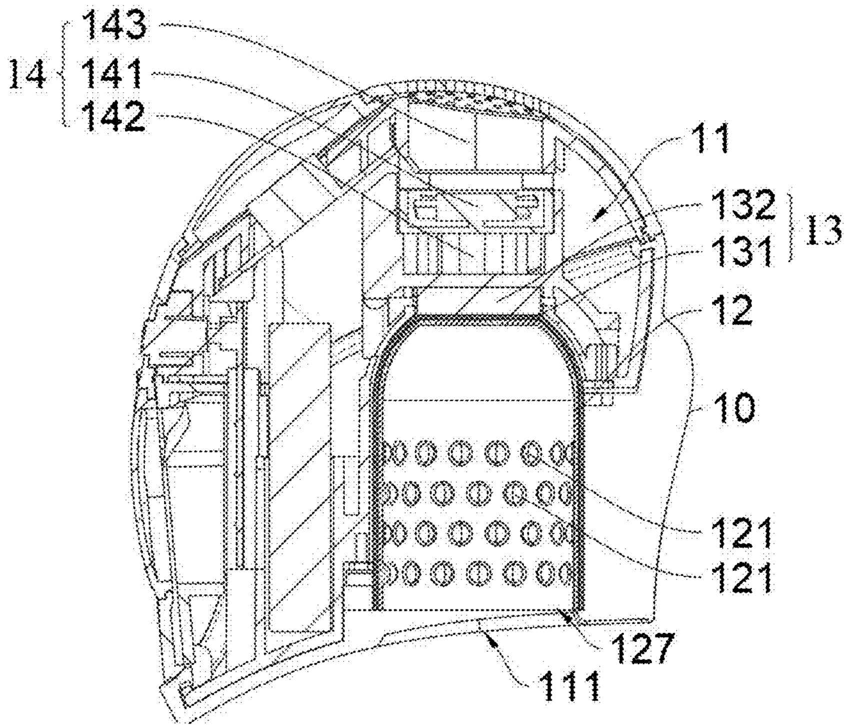
FIG. 2 is a schematic diagram of a sectional structure of a sexual stimulation device provided in some embodiments of the present disclosure.
Figure 3:
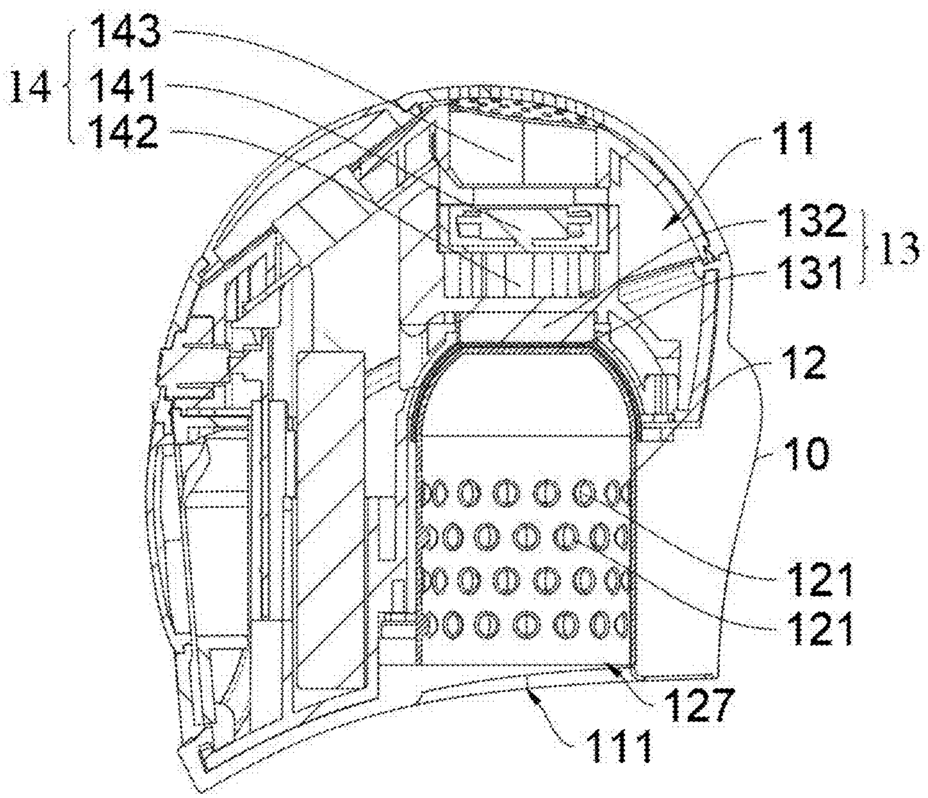
FIG. 3 is a schematic diagram of a sectional structure of a sexual stimulation device provided in other embodiments of the present disclosure.

Please refer to FIGS. 1 to 3, where FIG. 1 is a schematic structural diagram of a sexual stimulation device provided in some embodiments of the present disclosure, FIG. 2 is a schematic diagram of a sectional structure of a sexual stimulation device provided in some embodiments of the present disclosure, and FIG. 3 is a schematic diagram of a sectional structure of a sexual stimulation device provided in other embodiments of the present disclosure. A sexual stimulation device is provided in an embodiment of the present disclosure, including a housing 10, a flexible inner container 12, and a cold-heat generation assembly 13. The housing 10 includes an accommodating cavity 11, and the accommodating cavity 11 has a first opening 111. An end of the flexible inner container 12 is provided with a second opening 127 for insertion of a penis, an inner wall of the flexible inner container 12 is provided with a massage structure 121, the massage structure 121 provides massage stimulation to the penis, the flexible inner container 12 is disposed in the accommodating cavity 11, and a position of the second opening 127 corresponds to a position of the first opening 111. The cold-heat generation assembly 13 includes a heat conducting member 131 and a refrigeration and heating member 132, the heat conducting member 131 wraps an outer wall of the flexible inner container 12, the heat conducting member 131 is in contact with the outer wall of the flexible inner container 12, and the refrigeration and heating member 132 is in contact with a side of the heat conducting member 131 away from the flexible inner container 12; and the refrigeration and heating member 132 performs heat exchange with the flexible inner container 12 through the heat conducting member 131 such that the flexible inner container 12 reaches a preset temperature, and the preset temperature is a temperature required for the penis.

The housing 10 may have a hollow structure with an opening formed at one end, or the housing 10 may have a hollow structure with openings formed at opposite ends. The housing 10 may have various shapes, such as a cylindrical shape, a cuboid shape, or the like.

An inner contour shape of the flexible inner container 12 may match an outer contour shape of the penis, and for example, the inner contour shape of the flexible inner container 12 is a long tubular shape matching the outer contour shape of the penis. The inner contour shape of the flexible inner container 12 is configured to match the outer contour shape of the penis, such that an interior of the flexible inner container 12 better fits a skin surface of the penis, thereby enhancing a massage stimulation effect.

The massage structure 121 may be a protrusion disposed on the inner wall of the flexible inner container 12 or a depression disposed on the inner wall of the flexible inner container 12, and through the protrusion or the depression, when the flexible inner container 12 deforms, massage stimulation to the skin surface of the penis is provided.

The shape of the heat conducting member 131 may match the outer contour shape of the flexible inner container 12, and the heat conducting member 131 may be a metal sheet, such as an aluminum sheet, a copper sheet, or the like, or may be a thermally conductive silicone sheet, a thermally conductive graphite sheet, or the like.

The refrigeration and heating member 132 may be a semiconductor chilling plate, and in an embodiment where the refrigeration and heating member 132 is a semiconductor chilling plate, the semiconductor chilling plate may include a first portion and a second portion that are opposite to and fitted with each other, where the first portion and the second portion may be ceramic sheets; a plurality of pairs of PN junctions are disposed are disposed between the first portion and the second portion, each pair of PN junctions includes one N-type semiconductor and one P-type semiconductor that are electrically connected to each other, and connection points are disposed on the first portion and the second portion; when a first current is input to the semiconductor chilling plate, heat of the second portion is transferred to the first portion, such that a temperature of the first portion rises and a temperature of the second portion falls; the first portion transfers heat to the flexible inner container 12 through the heat conducting member 131, such that a temperature of the flexible inner container 12 rises; when a second current is input, heat of the first portion is transferred to the second portion, such that the temperature of the first portion falls and the temperature of the second portion rises; the flexible inner container 12 transfers heat to the first portion through the heat conducting member 131, such that the temperature of the flexible inner container 12 falls; and directions of the first current and the second current are opposite, and switching of the directions of the first current and the second current may be achieved through a current control assembly, where the current control assembly may include a control circuit board and a battery electrically connected to the control circuit board. The battery may be a rechargeable battery or an ordinary dry battery, and is configured to provide power to the control circuit board. The control circuit board may be a circuit board integrated with a single-chip microcomputer or any other CPU chip.

The heat conducting member 131 wraps the outer wall of the flexible inner container 12, as shown in FIG. 2, the heat conducting member 131 may completely wrap the outer wall of the flexible inner container 12, and as shown in FIG. 3, the heat conducting member 131 may partially wrap the outer wall of the flexible inner container 12.

Contact between the heat conducting member 131 and the outer wall of the flexible inner container 12 may be achieved through fitting between the heat conducting member 131 and the outer wall of the flexible inner container 12 by means of thermally conductive silicone, thermally conductive double-sided adhesive, or the like, and since the thermally conductive silicone and the thermally conductive double-sided adhesive have fluidity when pasted, air between the heat conducting member 131 and the outer wall of the flexible inner container 12 may be effectively discharged during a flow process, thereby improving an effect of contact between the heat conducting member 131 and the outer wall of the flexible inner container 12.

The contact between the heat conducting member 131 and the refrigeration and heating member 132 may be achieved through fitting between the heat conducting member 131 and a heat exchange plate by means of thermally conductive silicone, thermally conductive double-sided adhesive, or the like. Alternatively, the heat conducting member 131 and the refrigeration and heating member 132 may be fixedly connected through threaded engagement.

The preset temperature may be a temperature at which the penis feels comfortable, the preset temperature may range from 10° to 55°, and the preset temperature may be 10°, 15°, 20°, 25°, 30°, 35°, 40°, 45°, 50°, or a value within a range composed of any two of the above values.

In such a sexual stimulation device, the cold-heat generation assembly 13 includes the heat conducting member 131 and the refrigeration and heating member 132, the heat conducting member 131 wraps the outer wall of the flexible inner container 12, and the heat conducting member 131 is in contact with the outer wall of the flexible inner container 12, such that a surface of the heat conducting member 131 may be completely in contact with a surface of the outer wall of the flexible inner container 12 through wrapping and contact, thereby increasing an effective contact area between the heat conducting member 131 and the flexible inner container 12, and further enhancing thermal conduction efficiency between the heat conducting member 131 and the flexible inner container 12; the refrigeration and heating member 132 is in contact with the side of the heat conducting member 131 away from the flexible inner container 12, and the thermal conduction efficiency between the heat conducting member 131 and the flexible inner container 12 is enhanced, such that a speed of heat exchange between the refrigeration and heating member 132 and the flexible inner container 12 increases, which further enables the flexible inner container 12 to quickly reach the preset temperature; and since the surface of the heat conducting member 131 is completely in contact with the surface of the outer wall of the flexible inner container 12, a surface temperature distribution of the inner wall of the flexible inner container 12 is more uniform, and the penis may better feel the stimulation of hot compress or cold compress as the flexible inner container 12 quickly reaches the preset temperature and the surface temperature distribution is uniform.

The position of the second opening 127 corresponds to the position of the first opening 111, such that the penis may be easily inserted into the flexible inner container 12; and since the flexible inner container 12 has a certain deformability, when the penis is inserted into the flexible inner container 12, the flexible inner container 12 deforms to a certain extent, such that the flexible inner container 12 better fits the skin of the penis, thereby reducing a probability of gaps between the penis and the inner wall of the flexible inner container 12, further enhancing the thermal conduction efficiency between the penis and the flexible inner container 12, and further enabling the penis to better feel the stimulation of hot compress or cold compress.

Additionally, since the flexible inner container 12 better fits the skin of the penis, the massage structure 121 better fits the skin of the penis, such that the penis better feels the massage stimulation.

In summary, the heat conducting member 131 wraps the flexible inner container 12 and is in contact therewith, such that the flexible inner container 12 quickly reaches the preset temperature, the surface temperature distribution is more uniform, and the flexible inner container 12 provides good stimulation of hot compress or cold compress to the penis; additionally, when the flexible inner container 12 deforms, the flexible inner container 12 arranged better fits the skin of the penis, such that the flexible inner container 12 better provides hot compress, cold compress, massage, and other stimulations to the penis; and therefore, the cooperation between the heat conducting member 131, the refrigeration and heating member 132, and the flexible inner container 12 integrally improves a massage stimulation effect of the sexual stimulation device and enhances the user experience.

In some embodiments, with further reference to FIGS. 2 and 3, an air cooling assembly 14 is further included, and the air cooling assembly 14 includes a fan 141, a heat dissipation member 142, and an airflow channel 143, where one end of the airflow channel 143 communicates with the refrigeration and heating member 132, the other end of the airflow channel 143 communicates with an exterior of the housing, the fan 141 and the heat dissipation member 142 are disposed in the airflow channel 143, one side of the heat dissipation member 142 is connected to the refrigeration and heating member 132, and the other side of the heat dissipation member 142 is connected to the fan 141.

The connection between the heat dissipation member 142 and the refrigeration and heating member 132 may be a fixed connection by means of an adhesive, such as thermally conductive silicone or thermally conductive double-sided adhesive, or may be a fixed connection by means of a thread, such as a bolt, a nut, or the like.

The connection between the heat dissipation member 142 and the fan 141 may be a fixed connection by means of an adhesive, such as thermally conductive silicone or thermally conductive double-sided adhesive, or may be a fixed connection by means of a thread, such as a bolt, a nut, or the like.

The heat dissipation member 142 may be a bionic fish tail fin heat sink plate, a heat dissipation fin, or the like, and the heat dissipation member 142 may be made of a metal material, such as copper, aluminum, or the like.

When the first current is input, the heat of the second portion is transferred to the first portion, such that the temperature of the first portion rises and the temperature of the second portion falls, the first portion heats a massage area, and in this case, the fan 141 rotates to blow external air (a temperature of the external air is higher than the temperature of the second portion in this case) to the second portion, such that a temperature difference between the first portion and the second portion is reduced, and the semiconductor chilling plate is in a stable operating state; and when the second current is input, the heat of the first portion is transferred to the second portion, such that the temperature of the first portion falls and the temperature of the second portion rises, the first portion cools the massage area, and in this case, the fan 141 rotates to blow the heat of the second portion to the outside, such that the temperature difference between the first portion and the second portion is reduced, and the semiconductor chilling plate is in the stable operating state.

In this embodiment, the air cooling assembly 14 includes the fan 141, the heat dissipation member 142, and the airflow channel 143; to cool the refrigeration and heating member 132 as needed, since one side of the heat dissipation member 142 is connected to the refrigeration and heating member 132 and the other side thereof is connected to the fan 141, the heat dissipation member 142 transfers heat on the refrigeration and heating member 132 to the fan 141, and then the fan 141 rotates to generate an airflow, where the generated airflow transfers the heat on the refrigeration and heating member 132 to the exterior of the housing through the airflow channel 143, thereby cooling the refrigeration and heating member 132; to heat the refrigeration and heating member 132 as needed, the heat outside the housing is transferred to the fan 141 through the airflow generated by the rotation of the fan 141 and through the airflow channel 143; and since one side of the heat dissipation member 142 is connected to the refrigeration and heating member 132 and the other side thereof is connected to the fan 141, the heat dissipation member 142 transfers external heat introduced by the fan 141 to the refrigeration and heating member 132, thereby heating the refrigeration and heating member 132, such that the air cooling assembly 14 enables the refrigeration and heating member 132 to be in the stable operating state, and operating stability of the sexual stimulation device is enhanced.

Figure 4:
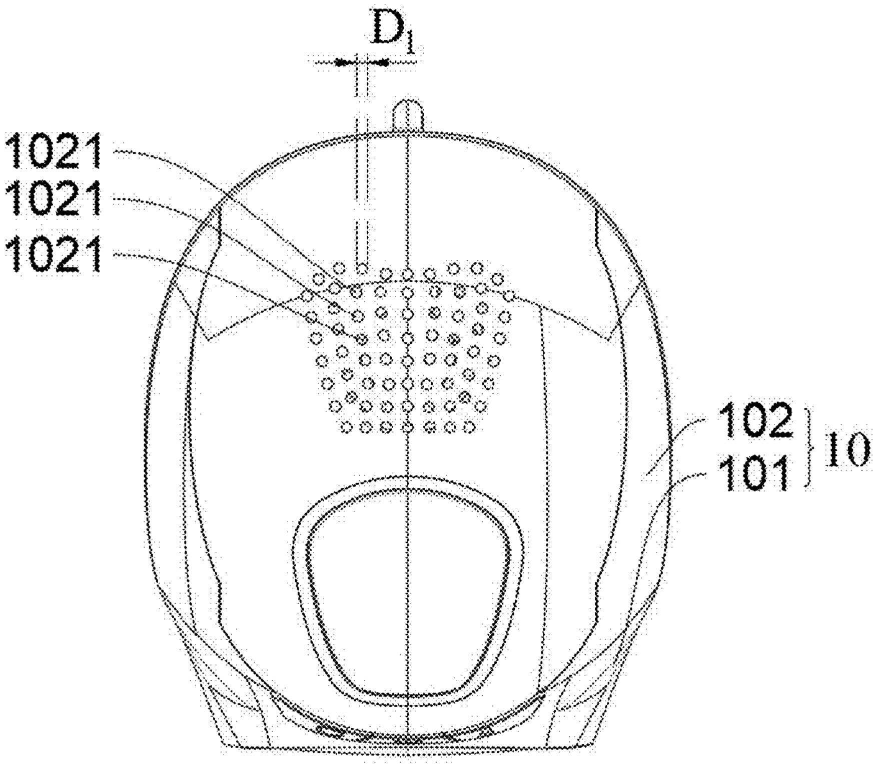
FIG. 4 is a schematic structural diagram of a sexual stimulation device provided in other embodiments of the present disclosure.

In some embodiments, with reference to FIG. 4 (FIG. 4 is a schematic structural diagram of a sexual stimulation device provided in other embodiments of the present disclosure), the housing 10 includes a first housing 101 held by the user and a second housing 102 not held by the user, the second housing 102 is provided with a ventilation hole 1021, and the ventilation hole 1021 communicates with the airflow channel 143.

The first housing 101 and the second housing 102 may be made of a same material such as a metal material, a silicone material, or a plastic material, or may be made of different materials; in an embodiment where the first housing 101 and the second housing 102 are made of different materials, the first housing 101 may be made of a silicone material or the like, and the second housing 102 may be made of a plastic material or the like; since the first housing 101 is a portion held by the user, it is therefore made of a relatively soft silicone material, which further improves the feeling of grip by the user's hand; and additionally, the second housing 102 is made of a relatively hard plastic material, such that the second housing 102 has a certain structural strength to meet the needs of installing other components.

In this embodiment, when the user holds and uses the sexual stimulation device, the user's hand may inadvertently block an end of the airflow channel 143 communicating with the exterior of the housing, thereby affecting the flow of airflow in the airflow channel 143 and further affecting the effect of the air cooling assembly 14 on heating or cooling the refrigeration and heating member 132; therefore, the housing is configured to include the first housing 101 held by the user and the second housing 102 not held by the user, and the ventilation hole 1021 communicating with the airflow channel 143 is formed on the second housing 102, such that the user holds the sexual stimulation device through the first housing 101 during the use of the sexual stimulation device; and since the user's hand is located on the first housing 101, the ventilation hole 1021 on the second housing 102 is not blocked, and additionally, since the ventilation hole 1021 communicates with the airflow channel 143, during the process of heat exchange through the airflow channel 143, the airflow in the airflow channel 143 flows freely without being blocked by the hand, thereby further improving the effect of the air cooling assembly 14 on heating or cooling the refrigeration and heating member 132.

Figure 5:
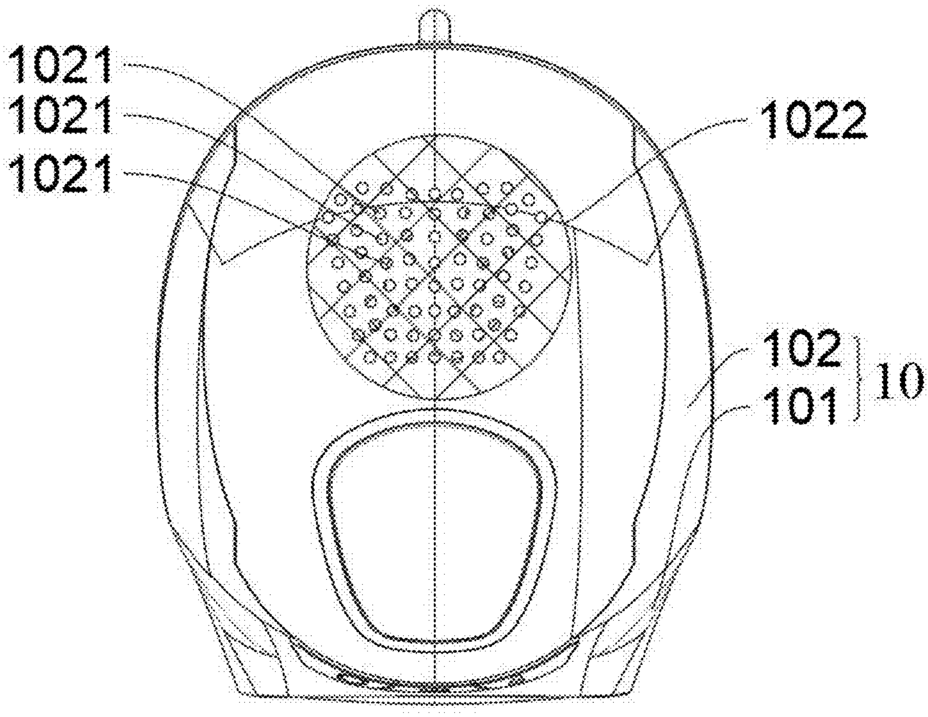
FIG. 5 is a schematic structural diagram of a sexual stimulation device provided in other embodiments of the present disclosure (showing a dustproof net).

In some embodiments, with reference to FIG. 5 (FIG. 5 is a schematic structural diagram of a sexual stimulation device provided in other embodiments of the present disclosure (showing a dustproof net), a dustproof net 1022 is further disposed on the ventilation hole 1021.

In this embodiment, the dustproof net 1022 is configured to prevent dust from entering and accumulating in the sexual stimulation device, thereby ensuring heat dissipation and operation of components.

In some embodiments, with further reference to FIG. 4, a plurality of ventilation holes 1021 are formed, the plurality of ventilation holes 1021 are uniformly distributed on the second housing 102, and aperture diameters of the ventilation holes 1021 range from 0.5 mm to 1.5 mm.

An aperture diameter of each of the ventilation holes 1021 may be 0.5 mm, 0.6 mm, 0.7 mm, 0.8 mm, 0.9 mm, 1 mm, 1.1 mm, 1.2 mm, 1.3 mm, 1.4 mm, 1.5 mm, or a value within a range composed of any two of the above values.

In a projection plane perpendicular to a height direction Y of the flexible inner container 12, an orthographic projection shape of the ventilation holes 1021 may be circular or rectangular, and in an embodiment where the orthographic projection shape of the ventilation holes 1021 is circular, an aperture diameter of the ventilation hole 1021 is a diameter D1 of the ventilation hole 1021, and D1 satisfies 0.5 mm≤D1≤1.5 mm, and D1 may be 0.5 mm, 0.6 mm, 0.7 mm, 0.8 mm, 0.9 mm, 1 mm, 1.1 mm, 1.2 mm, 1.3 mm, 1.4 mm, 1.5 mm, or a value within a range composed of any two of the above values.

In this embodiment, when the ventilation holes 1021 on the second housing 102 are too small or too few, airflow resistance increases, thereby compromising the effect of the air cooling assembly 14 on heating or cooling the refrigeration and heating member 132; and when the ventilation holes 1021 on the second housing 102 are too large or too numerous, the structural strength of the second housing 102 is compromised, and therefore, the plurality of ventilation holes 1021 are uniformly distributed on the second housing 102 and the aperture diameters of the ventilation holes 1021 range from 0.5 mm to 1.5 mm, such that the number and size of the ventilation holes 1021 are relatively reasonable under the premise of meeting the conditions for airflow resistance and the structural strength of the second housing 102.

In some embodiments, the refrigeration and heating member 132 is a semiconductor chilling plate, and the heat conducting member 131 is an aluminum sheet or a copper sheet.

In this embodiment, since the semiconductor chilling plate actively and accurately achieves heat transfer through electric energy, and since the aluminum sheet or the copper sheet exhibits good thermal conductivity, the cold-heat generation assembly composed of the semiconductor chilling plate and the aluminum sheet (the copper sheet) improves the effect of temperature control over the flexible inner container.

Figure 6:
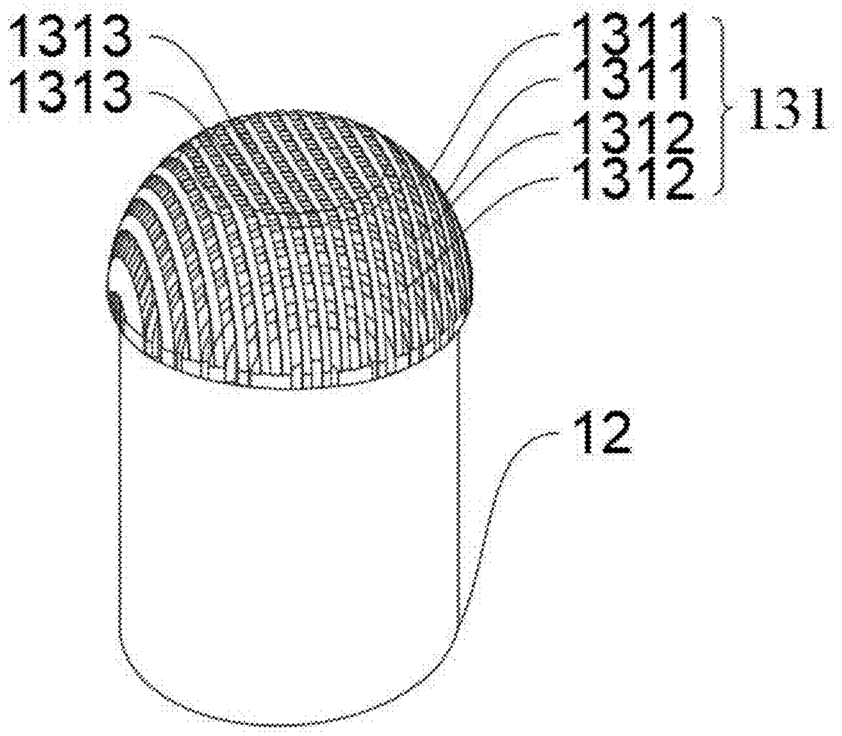
FIG. 6 is a schematic diagram of an assembly structure of a heat conducting member and a flexible inner container in a sexual stimulation device provided in some embodiments of the present disclosure.

In some embodiments, with reference to FIG. 6 (FIG. 6 is a schematic diagram of an assembly structure of a heat conducting member and a flexible inner container in a sexual stimulation device provided in some embodiments of the present disclosure), The heat conducting member 131 includes a plurality of first components 1311 and a plurality of second components 1312, the plurality of first components 1311 and the plurality of second components 1312 are intercrossedly arranged to form a mesh structure, and first deformation spaces 1313 for the deformation of the flexible inner container 12 are formed in the mesh structure.

The first components 1311 and the second components 1312 may be elongated connectors.

In this embodiment, although wrapping the flexible inner container 12 with the heat conducting member 131 enables to well improve the thermal conduction efficiency between the heat conducting member 131 and the flexible inner container 12, since the heat conducting member 131 completely wraps the flexible inner container 12 and is in contact therewith, there is no space for the flexible inner container 12 to deform under the premise of a certain thickness, which leads to poor deformation effect of the flexible inner container 12; to balance the thermal conduction efficiency and the deformation effect of the flexible inner container 12, the heat conducting member 131 is configured to have the mesh structure composed of the plurality of first components 1311 and the plurality of second components 1312, and the mesh structure has the first deformation spaces 1313 for the deformation of the flexible inner container 12; firstly, structural characteristics of the mesh structure enable to minimize the reduction in an effective contact area between the heat conducting member 131 and the flexible inner container 12, thereby minimizing the reduction in the thermal conduction efficiency; secondly, the first deformation spaces 1313 enable the squeezed flexible inner container 12 to move into the first deformation spaces 1313 when the flexible inner container 12 is subjected to an external force, such that the flexible inner container 12 has a good deformation effect; and therefore, the design of the mesh structure of the heat conducting member 131 enables to balance the thermal conduction efficiency and the deformation effect of the flexible inner container 12.

Figure 7:
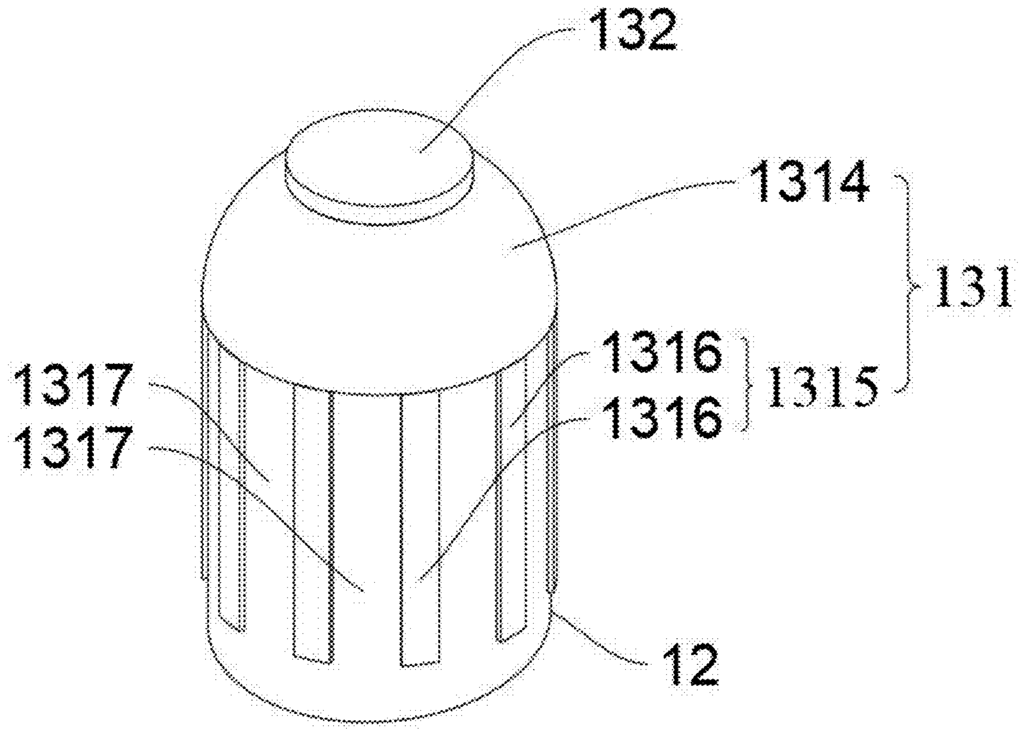
FIG. 7 is a schematic diagram of an assembly structure of a cold-heat generation assembly and a flexible inner container in a sexual stimulation device provided in some embodiments of the present disclosure.

In some embodiments, with reference to FIG. 7 (FIG. 7 is a schematic diagram of an assembly structure of a cold-heat generation assembly and a flexible inner container in a sexual stimulation device provided in some embodiments of the present disclosure), the heat conducting member 131 includes a first main body part 1314 in contact with the refrigeration and heating member 132 and a second main body part 1315 not in contact with the refrigeration and heating member 132, the second main body part 1315 includes a plurality of third components 1316 arranged at intervals along an outer periphery of the flexible inner container 12, and a second deformation space 1317 for the deformation of the flexible inner container 12 is formed between two adjacent third components 1316 among the plurality of third components 1316.

The first main body part 1314 may be a complete sheet-like structure or a mesh structure, and for example, the first main body part includes a plurality of first components 1311 and a plurality of second components 1312, and the plurality of first components 1311 and the plurality of second components 1312 are intercrossedly arranged to form a mesh structure.

The third components 1316 may be elongated connectors.

In this embodiment, although wrapping the flexible inner container 12 with the heat conducting member 131 enables to well improve the thermal conduction efficiency between the heat conducting member 131 and the flexible inner container 12, since the heat conducting member 131 completely wraps the flexible inner container 12 and is in contact therewith, there is no space for the flexible inner container 12 to deform under the premise of a certain thickness, which leads to poor deformation effect of the flexible inner container 12; to balance the thermal conduction efficiency and the deformation effect of the flexible inner container 12, the heat conducting member 131 includes the second main body part 1315, the second main body part 1315 includes the plurality of third components 1316 arranged at intervals along the outer periphery of the flexible inner container 12, and the second deformation space 1317 for the deformation of the flexible inner container 12 is formed between two adjacent third components 1316 among the plurality of third components 1316; firstly, the structure of the second main body part 1315 composed of the plurality of third components 1316 arranged at intervals enables to minimize the reduction in an effective contact area between the second main body part 1315 and the flexible inner container 12, thereby minimizing the reduction in the thermal conduction efficiency; secondly, the second deformation spaces 1317 enable the squeezed flexible inner container 12 to move into the second deformation spaces 1317 when the flexible inner container 12 is subjected to an external force, such that a portion of the flexible inner container 12 located in the second main body part 1315 has a good deformation effect; and therefore, the design of the structure of the second main body part 1315 enables to balance the thermal conduction efficiency between the second main body part 1315 and the flexible inner container 12 and the deformation effect of the portion of the flexible inner container 12 located in the second main body part 1315.

Figure 8:
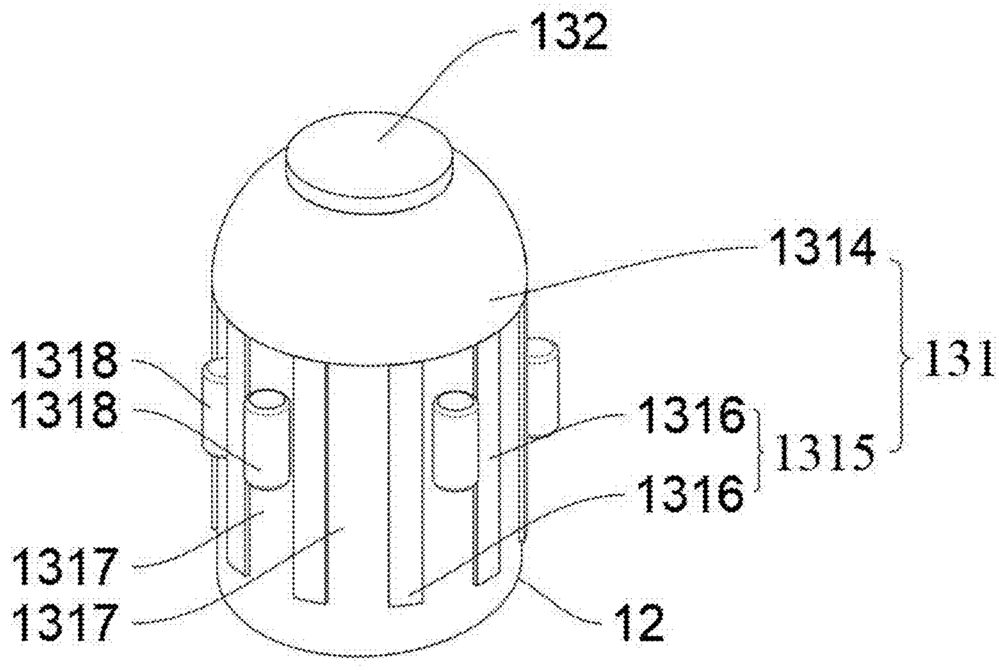
FIG. 8 is a schematic diagram of an assembly structure of a cold-heat generation assembly and a flexible inner container in a sexual stimulation device provided in some embodiments of the present disclosure) (showing a first vibration motor).

In some embodiments, with reference to FIG. 8 (FIG. 8 is a schematic diagram of an assembly structure of a cold-heat generation assembly and a flexible inner container in a sexual stimulation device provided in some embodiments of the present disclosure) (showing a first vibration motor), a first vibration motor 1318 is further included, the first vibration motor 1318 is disposed in the second deformation space 1317, and the first vibration motor 1318 drives the flexible inner container 12 to vibrate.

The first vibration motor 1318 may be a flat vibration motor, a cylindrical vibration motor, or a surface-mounted vibration motor.

A plurality of first vibration motors 1318 may be provided, and the plurality of first vibration motors 1318 are arranged in one-to-one correspondence with the plurality of second deformation spaces 1317. The plurality of first vibration motors 1318 are arranged in one-to-one correspondence with the second deformation spaces 1317, such that the plurality of first vibration motors 1318 are sequentially arranged along the outer periphery of the flexible inner container 12, and the plurality of first vibration motors 1318 are sequentially arranged, such that vibrations generated by the flexible inner container 12 are more uniform, and the massage stimulation effect is further enhanced.

In this embodiment, the first vibration motors 1318 are arranged in the second deformation spaces 1317, and a corresponding area of the flexible inner container 12 is vibrated by the first vibration motors 1318, such that vibration massage stimulation is provided, and the massage function of the sexual stimulation device is further enriched.

Figure 9:
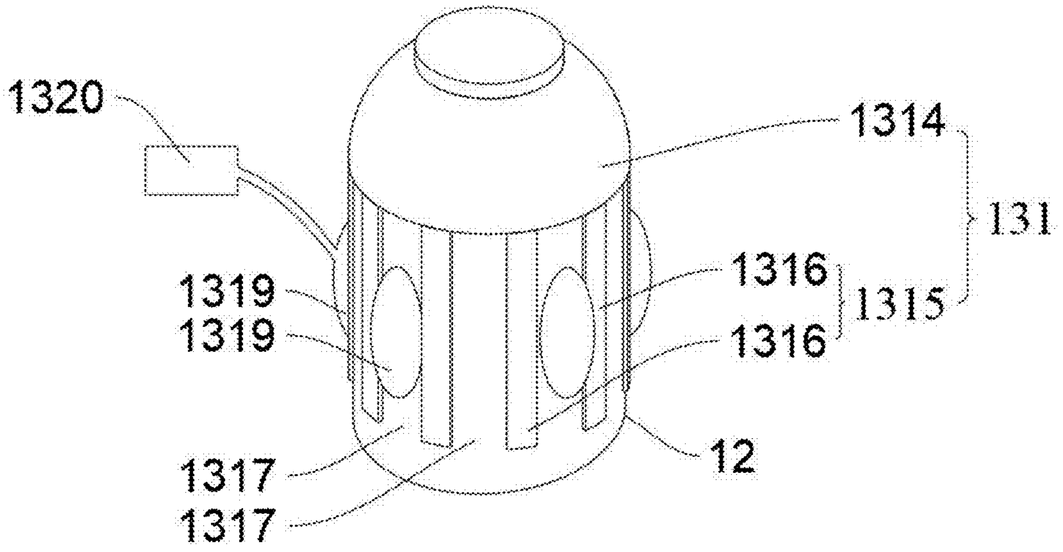
FIG. 9 is a schematic diagram of an assembly structure of a cold-heat generation assembly and a flexible inner container in a sexual stimulation device provided in some embodiments of the present disclosure (showing a first airbag).

In some embodiments, with reference to FIG. 9 (FIG. 9 is a schematic diagram of an assembly structure of a cold-heat generation assembly and a flexible inner container in a sexual stimulation device provided in some embodiments of the present disclosure) (showing a first airbag), a first airbag 1319 and a first air pump 1320 are further included, the first airbag 1319 communicates with the first air pump 1320, the first airbag 1319 is disposed in the second deformation space 1317, and the first air pump 1320 controls the expansion or contraction of the first airbag 1319 to deform the flexible inner container 12.

A plurality of first airbags 1319 may be provided, and the plurality of first airbags 1319 are arranged in one-to-one correspondence with the plurality of second deformation spaces 1317. The plurality of first airbags 1319 are arranged in one-to-one correspondence with the second deformation spaces 1317, such that the plurality of first airbags 1319 are sequentially arranged along the outer periphery of the flexible inner container 12, and the plurality of first airbags 1319 are sequentially arranged, such that the deformation generated by the flexible inner container 12 is more uniform, and the massage effect is further enhanced.

In this embodiment, the first airbag 1319 and the first air pump 1320 that communicate with each other are arranged, and the first airbag 1319 is disposed in the second deformation space 1317, such that when the first air pump 1320 controls the expansion of the first airbag 1319, the first airbag 1319 squeezes the flexible inner container 12, such that a deformation capacity of a corresponding area of the flexible inner container 12 is increased; and therefore, during use, the flexible inner container 12 is more likely to deform based on a shape of the massage area, such that an inner wall of the flexible inner container 12 better fits the skin of the massage area, and the massage stimulation effect is further enhanced. When the first air pump 1320 controls the contraction of the first airbag 1319, a compressive force exerted by the first airbag 1319 on the corresponding area of the flexible inner container 12 disappears, and the flexible inner container 12 returns to its original shape under the action of its own deformation.

Figure 10:
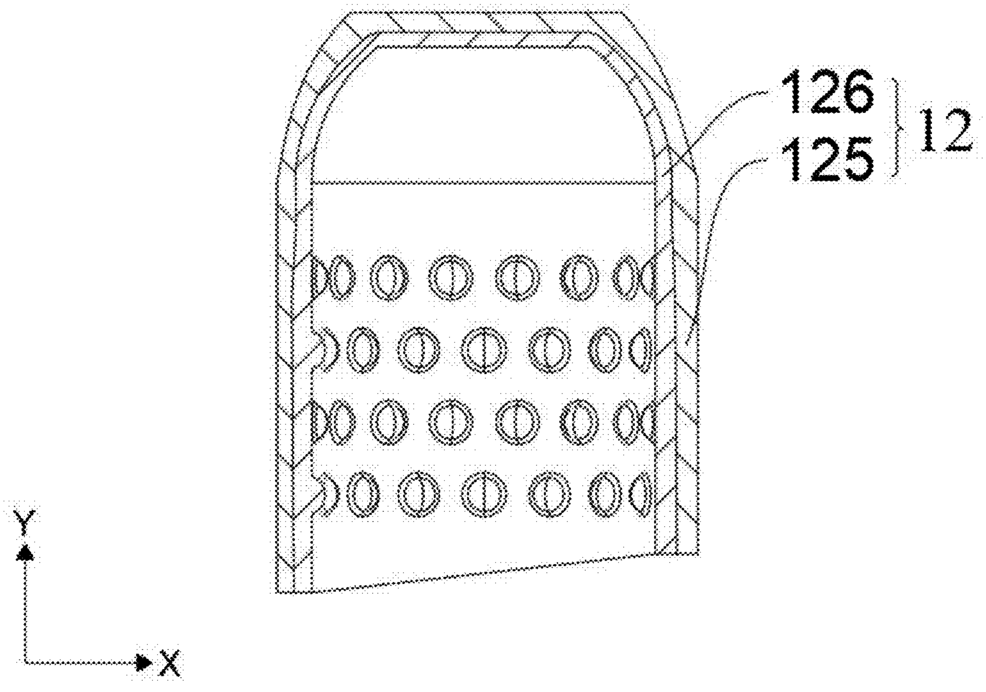
FIG. 10 is a schematic structural diagram of a flexible inner container in a sexual stimulation device provided in some embodiments of the present disclosure.

In some embodiments, with reference to FIG. 10 (FIG. 10 is a schematic structural diagram of a flexible inner container in a sexual stimulation device provided in some embodiments of the present disclosure), the flexible inner container 12 includes a first flexible main body part 125 and a second flexible main body part 126 sequentially arranged in a thickness direction X of the flexible inner container 12, and a Shore hardness of the first flexible main body part 125 is greater than a Shore hardness of the second flexible main body part 126.

Thicknesses of the first flexible main body part 125 and the second flexible main body part 126 may be the same or different.

The Shore hardness of the first flexible main body part 125 ranges from 00 A to 20 A, and the Shore hardness of the second flexible main body part 126 ranges from 20 A to 60 A.

The Shore hardness of the first flexible main body part 125 may be 00 A, 10 A, 15 A, 20 A, or a value within a range composed of any two of the above values.

The Shore hardness of the second flexible main body part 126 may be 00 A, 10 A, 15 A, 20 A, 30 A, 40 A, 50 A, 60 A, or a value within a range composed of any two of the above values.

The first flexible main body part 125 and the second flexible main body part 126 may be made of a flexible material, and the flexible material may be one or more of a thermoplastic elastomer (TPE), a polyolefin elastomer (POE), polyvinyl chloride (PVC), silicone, and liquid silicone.

In this embodiment, the flexible inner container 12 includes at least two layers of the first main body part 1314 and the second main body part 1315 sequentially arranged in the thickness direction X, and a Shore hardness of the first main body part 1314 is greater than that of the second main body part 1315, such that the flexible inner container 12 forms a multi-layer structure with different hardness, and the flexible inner container 12 meets the requirements of massage and installation; specifically, the second main body part 1315 with a low Shore hardness serves as a layer in contact with the penis; since the Shore hardness of the second main body part 1315 is lower, the second main body part 1315 is relatively soft, which meets the needs of massage stimulation; and the first main body part 1314 with a higher Shore hardness serves as a layer for installing various components, and since the Shore hardness of the first main body part 1314 is higher, the first main body part 1314 is relatively harder, which meets structural strength requirements for installing various components.

In some embodiments, the flexible inner container 12 is made of a flexible material, and the flexible material is one or more of TPE, POE, silicone, and liquid silicone.

TPE refers to a thermoplastic elastomer, and for example, and TPE may be a material used for the preparation of medical-grade products, such as a styrene-based TPE, an olefin-based TPE, a diene-based TPE, or the like.

In this embodiment, the flexible material is configured to be one or more of TPE, POE, silicone, and liquid silicone, and since the materials such as TPE, POE, silicone, or liquid silicone have a lower Shore hardness, the flexible inner container 12 has a lower elastic modulus, so the flexible inner container 12 is softer and more prone to deformation; and therefore, during use, the flexible inner container 12 is more likely to deform based on the shape of the massage area of the penis, such that the massage structure 121 on the flexible inner container 12 better fits the skin of the penis, and the massage stimulation effect is further enhanced.

Figure 11:
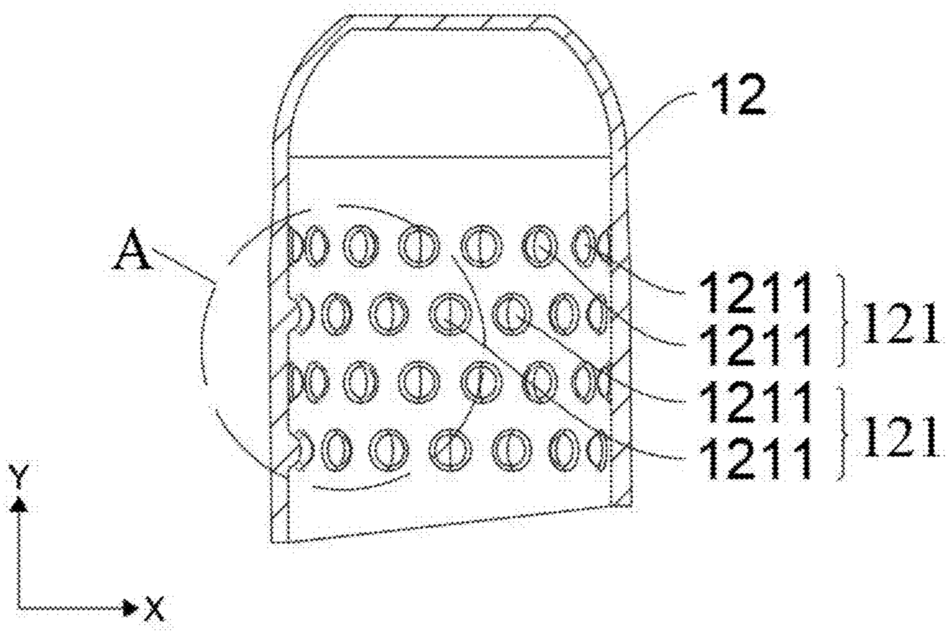
FIG. 11 is a schematic structural diagram of a flexible inner container in a sexual stimulation device provided in some embodiments of the present disclosure (showing a massage structure).

In some embodiments, with reference to FIG. 11 (FIG. 11 is a schematic structural diagram of a flexible inner container in a sexual stimulation device provided in some embodiments of the present disclosure (showing a massage structure), The inner wall of the flexible inner container 12 is provided with a plurality of massage structures 121, the plurality of massage structures 121 are arranged at intervals in the height direction Y of the flexible inner container 12, and each of the massage structures 121 includes a plurality of first protrusions 1211 arranged at intervals along an inner periphery of the flexible inner container 12.

The plurality of massage structures 121 may be arranged at equal intervals in the height direction Y of the flexible inner container 12, or arranged at unequal intervals in the height direction Y of the flexible inner container 12.

In an embodiment where the plurality of massage structures 121 are arranged at equal intervals in the height direction Y of the flexible inner container 12, a spacing between two adjacent massage structures 121 among the plurality of massage structures 121 ranges from 2 mm to 5 mm. The spacing between two adjacent massage structures 121 may be 2 mm, 3 mm, 4 mm, 5 mm, or a value within a range composed of any two of the above values.

A shape of each of the first protrusions 1211 may be one or more of a cuboid shape, a cube shape, a sphere shape, a cylinder shape, and a cone shape.

In an embodiment where the shape of the first protrusion 1211 is the sphere shape, a radius of the first protrusion 1211 ranges from 1 mm to 3 mm. The radius of the first protrusion 1211 may be 1 mm, 2 mm, 3 mm, or a value within a range composed of any two of the above values.

The plurality of first protrusions 1211 may be arranged at equal intervals along the inner periphery of the flexible inner container 12, or arranged at unequal intervals along the inner periphery of the flexible inner container 12.

In an embodiment where the plurality of first protrusions 1211 are arranged at equal intervals along the inner periphery of the flexible inner container 12, a spacing between two adjacent first protrusions 1211 among the plurality of first protrusions 1211 ranges from 1 mm to 4 mm. The spacing between two adjacent first protrusions 1211 may be 1 mm, 2 mm, 3 mm, 4 mm, or a value within a range composed of any two of the above values.

In this embodiment, the massage structures 121 are arranged at intervals in the height direction Y of the flexible inner container 12, such that the massage structures 121 are more reasonably distributed on the inner wall of the flexible inner container 12, and the massage structures 121 fully massage the massage area of the penis; and additionally, each of the massage structures 121 is composed of a plurality of the first protrusions 1211 arranged at intervals, and different contact effects are generated during the massage process through the first protrusions 1211, such that the massage stimulation effect may be improved by arranging the massage structures 121 composed of the first protrusions 1211.

Figure 12:
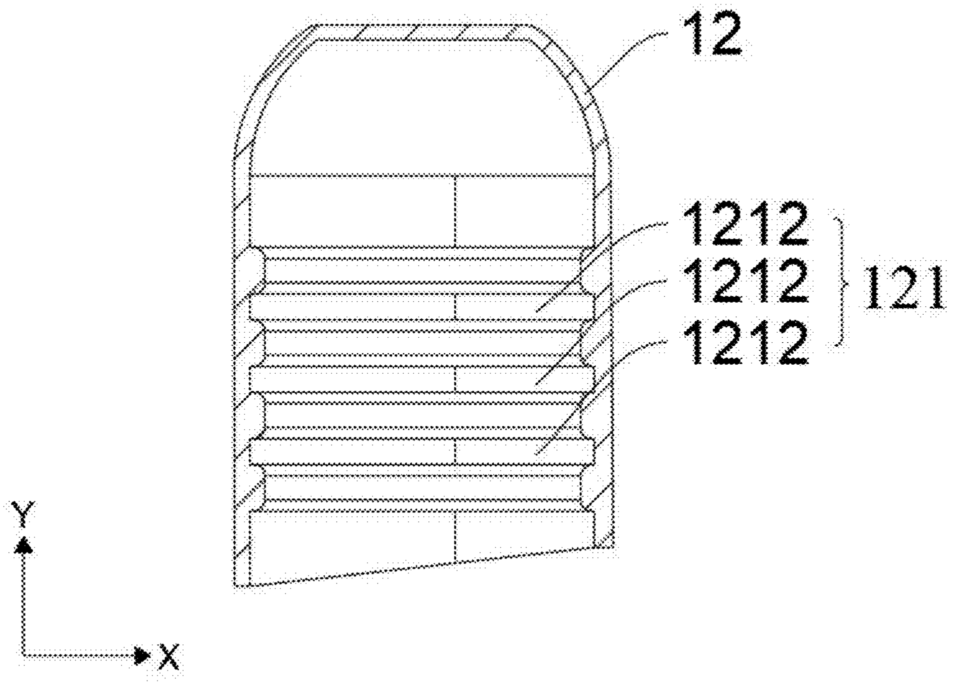
FIG. 12 is a schematic structural diagram of a flexible inner container in a sexual stimulation device provided in some embodiments of the present disclosure (showing a massage structure).
Figure 13:
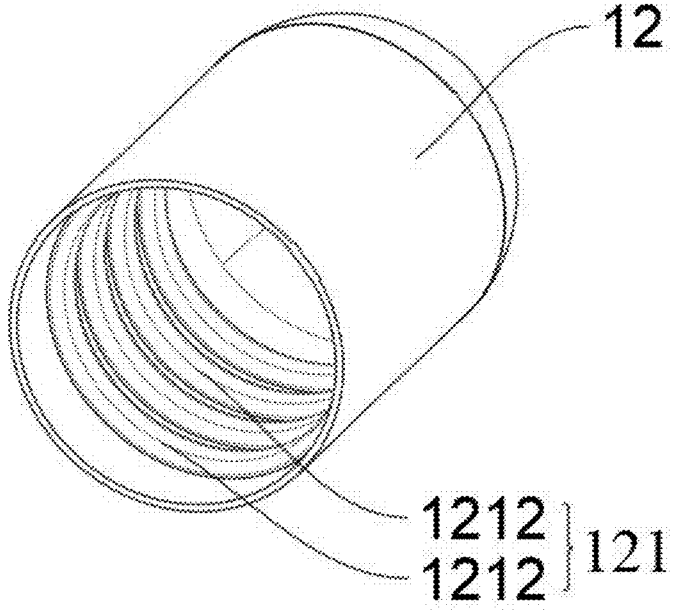
FIG. 13 is a schematic structural diagram of a flexible inner container in a sexual stimulation device provided in some embodiments of the present disclosure (showing a massage structure).

In some embodiments, with reference to FIGS. 12 and 13 (FIG. 12 is a schematic structural diagram of a flexible inner container in a sexual stimulation device provided in other embodiments of the present disclosure (showing a massage structure), and FIG. 13 is a schematic structural diagram of a flexible inner container in a sexual stimulation device provided in yet other embodiments of the present disclosure (showing a massage structure)), the inner wall of the flexible inner container 12 is provided with a plurality of massage structures 121, the plurality of massage structures 121 are arranged at intervals in the height direction Y of the flexible inner container 12, and each of the massage structures 121 includes second protrusions 1212 extending uninterruptedly along the inner periphery of the flexible inner container 12.

The plurality of massage structures 121 may be arranged at equal intervals in the height direction Y of the flexible inner container 12, or arranged at unequal intervals in the height direction Y of the flexible inner container 12.

In an embodiment where the plurality of massage structures 121 are arranged at equal intervals in the height direction Y of the flexible inner container 12, a spacing between two adjacent massage structures 121 among the plurality of massage structures 121 ranges from 2 mm to 5 mm. The spacing between two adjacent massage structures 121 may be 2 mm, 3 mm, 4 mm, 5 mm, or a value within a range composed of any two of the above values.

When an orthographic projection of the second protrusion 1212 is elongated, the second protrusion 1212 may be a straight line segment.

When the orthographic projection of the second protrusion 1212 is wavy, the second protrusion 1212 may be composed of a plurality of curved segments connected sequentially, or a plurality of arc segments connected sequentially.

In this embodiment, the massage structures 121 are arranged at intervals in the height direction Y of the flexible inner container 12, such that the massage structures 121 are more reasonably distributed on the inner wall of the flexible inner container 12, and the massage structures 121 fully massage the penis; and additionally, each of the massage structures 121 includes the second protrusions 1212 extending uninterruptedly along the inner periphery of the flexible inner container 12, since the second protrusions 1212 are structurally continuous and uninterrupted, the second protrusions 1212 may be spirally arranged in an axial direction of the massage area of the penis, such that the second protrusions 1212 better cover the massage area in a circumferential direction; and the second protrusions 1212 also generate different contact effects during the massage process, and therefore, the massage stimulation effect may be improved by arranging the second massage structures 121 composed of the second protrusions 1212.

Figure 14:
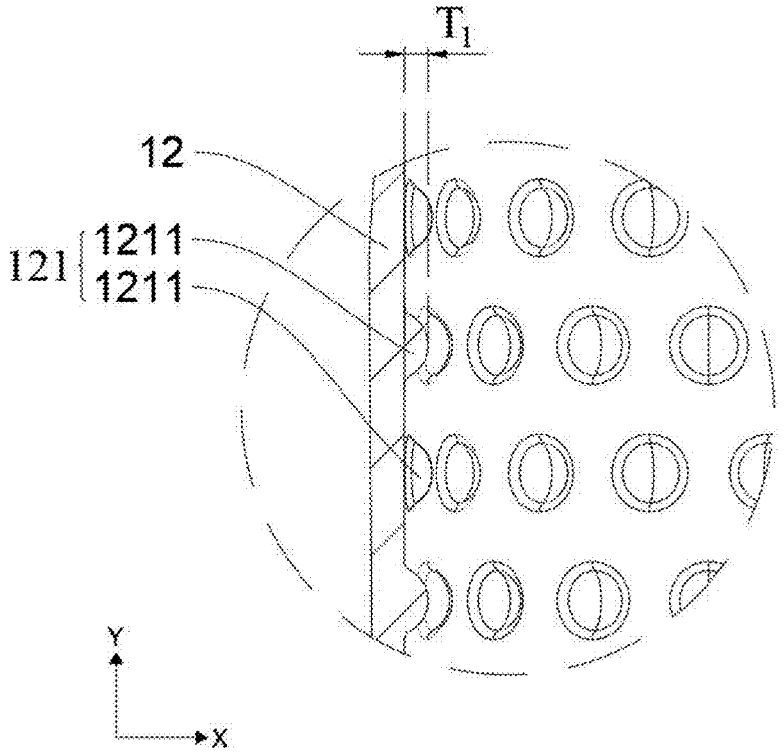
FIG. 14 is a partial enlarged view of a portion A in FIG. 11.

In some embodiments, with reference to FIG. 14 (FIG. 14 is a partial enlarged view of a portion A in FIG. 11), the massage structure 121 has a thickness of T1, where 1 mm≤T1≤5 mm.

T1 may be 1 mm, 3 mm, 5 mm, or a value within a range composed of any two of the above values.

In this embodiment, when a portion of the massage structure 121 protruding from the inner wall of the flexible inner container 12 is relatively thicker, a massage stimulation intensity exerted by the massage structure 121 on the massage area during massage is excessive, which results in discomfort during the massage process; and therefore, 1 mm≤T1≤5 mm is set, such that the massage structure 121 has an appropriate thickness, thereby enhancing the comfort during a massage stimulation process.

Figure 15:
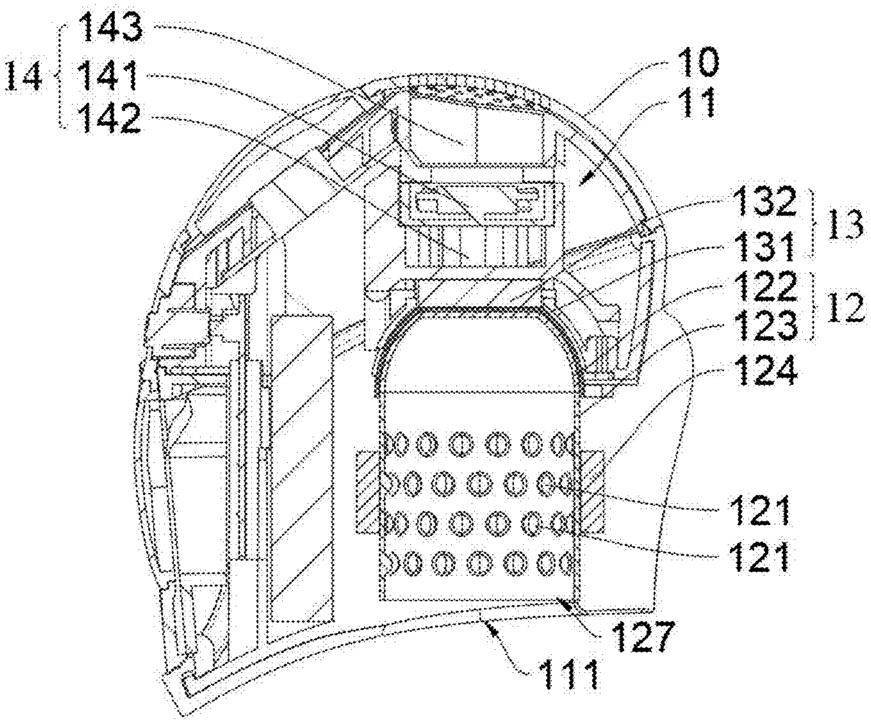
FIG. 15 is a schematic structural diagram of a sexual stimulation device provided in some embodiments of the present disclosure (showing a second vibration motor).

In some embodiments, with reference to FIG. 15 (FIG. 15 is a schematic structural diagram of a sexual stimulation device provided in some embodiments of the present disclosure (showing a second vibration motor), a sexual stimulation device is provided in an embodiment of the present disclosure, including a housing 10, a flexible inner container 12, a cold-heat generation assembly 13, and a second vibration motor 124. The housing 10 includes an accommodating cavity 11, and the accommodating cavity 11 has a first opening 111. An end of the flexible inner container 12 is provided with a second opening 127 for insertion of a penis, an inner wall of the flexible inner container 12 is provided with a massage structure 121, the massage structure 121 provides massage stimulation to the penis, the flexible inner container 12 is disposed in the accommodating cavity 11, and a position of the second opening 127 corresponds to a position of the first opening 111; and the flexible inner container 12 is provided with a first massage portion 122 in contact with the glans of the penis and a second massage portion 123 not in contact with the glans of the penis. The cold-heat generation assembly 13 includes a heat conducting member 131 and a refrigeration and heating member 132, the heat conducting member 131 wraps an outer wall of the first massage portion 122, the heat conducting member 131 is in contact with the outer wall of the first massage portion 122, and the refrigeration and heating member 132 is in contact with a side of the heat conducting member 131 away from the first massage portion 122. The second vibration motor 124 is disposed on an outer wall of the second massage portion 123. The refrigeration and heating member 132 performs heat exchange with the first massage portion 122 through the heat conducting member 131 until the first massage portion 122 reaches a preset temperature, the preset temperature is a temperature required for the glans, and the second vibration motor 124 drives the second massage portion 123 to vibrate.

The second vibration motor 124 may be a flat vibration motor, a cylindrical vibration motor, or a surface-mounted vibration motor.

In this embodiment, the flexible inner container 12 includes the first massage portion 122 in contact with the glans of the penis and the second massage portion 123 not in contact with the glans of the penis, the heat conducting member 131 is disposed on the outer wall of the first massage portion 122, and the second vibration motor 124 is disposed on the outer wall of the second massage portion 123, such that heat exchange between the refrigeration and heating member 132 and the first massage portion 122 through the heat conducting member 131 enables the first massage portion 122 to reach the preset temperature, and the first massage portion 122 provides stimulation of hot compress or cold compress to the glans of the penis; and the second vibration motor 124 causes vibration of the second massage portion 123, such that the second massage portion 123 provides vibration massage stimulation to other parts of the penis, and furthermore, the sexual stimulation device provides different stimulation effects for different parts of the penis, thereby meeting the user's use needs.

Figure 16:
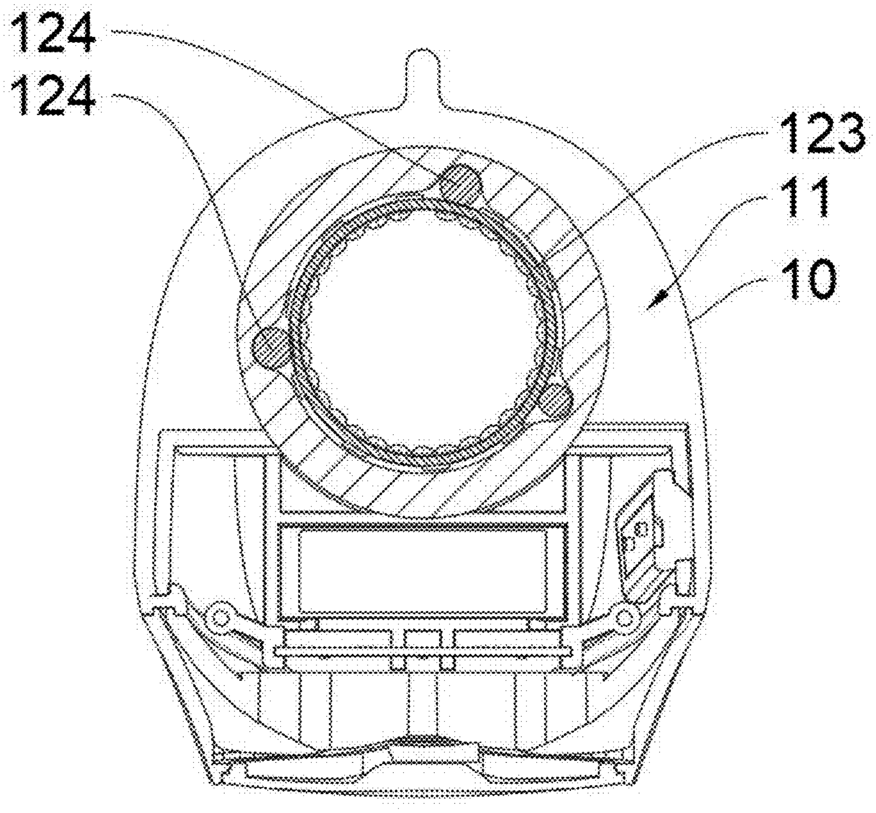
FIG. 16 is a schematic structural diagram of a sexual stimulation device provided in other embodiments of the present disclosure (showing a second vibration motor).

In some embodiments, with reference to FIG. 16 (FIG. 16 is a schematic structural diagram of a sexual stimulation device provided in other embodiments of the present disclosure (showing a second vibration motor), A plurality of second vibration motors 124 are included, and the plurality of second vibration motors 124 are uniformly arranged along an outer periphery of the second massage portion 123.

In this embodiment, the plurality of second vibration motors 124 are uniformly arranged around the outer periphery of the second massage portion 123, such that setting the number and positions of the second vibration motors 124 enables each area of the second massage portion 123 to generate a vibration with a same amplitude, thereby improving the stimulation effect of the second massage portion 123.

It should be noted that the embodiments in the present disclosure and features in the embodiments can be combined without conflicts.

The above embodiments are only used to illustrate the technical solutions of the present disclosure, and are not intended to limit the present disclosure. For those skilled in the art, the present disclosure may have various modifications and changes. Any modifications, equivalent substitutions, improvements, and the like within the spirit and principles of the present disclosure are intended to be included within the scope of protection of the present disclosure.

What is claimed is:

1. A sexual stimulation device, comprising:
   - a housing, wherein the housing comprises an accommodating cavity, and the accommodating cavity has a first opening;
   - a flexible inner container, wherein an end of the flexible inner container is provided with a second opening for insertion of a penis, an inner wall of the flexible inner container is provided with at least one massage structure, the at least one massage structure is configured to provide massage stimulation to the penis, the flexible inner container is disposed in the accommodating cavity, and a position of the second opening corresponds to a position of the first opening; and
   - a cold-heat generation assembly, wherein the cold-heat generation assembly comprises a heat conducting member and a refrigeration and heating member, the heat conducting member wraps an outer wall of the flexible inner container, the heat conducting member is in contact with the outer wall of the flexible inner container, and the refrigeration and heating member is in contact with a side of the heat conducting member away from the flexible inner container; and the refrigeration and heating member performs heat exchange with the flexible inner container through the heat conducting member such that the flexible inner container reaches a preset temperature, and the preset temperature is a temperature required for the penis.

2. The sexual stimulation device according to claim 1, further comprising an air cooling assembly, wherein the air cooling assembly comprises a fan, a heat dissipation member, and an airflow channel, one end of the airflow channel communicates with the refrigeration and heating member, the other end of the airflow channel communicates with an exterior of the housing, the fan and the heat dissipation member are disposed in the airflow channel, one side of the heat dissipation member is connected to the refrigeration and heating member, and the other side of the heat dissipation member is connected to the fan.

3. The sexual stimulation device according to claim 2, wherein the housing comprises a first housing configured to be held by a user and a second housing configured to be not held by the user, the second housing is provided with at least one ventilation hole, and the at least one ventilation hole communicates with the airflow channel.

4. The sexual stimulation device according to claim 3, wherein a dustproof net is further disposed on the at least one ventilation hole.

5. The sexual stimulation device according to claim 3, wherein the at least one ventilation hole includes a plurality of ventilation holes, the plurality of ventilation holes are uniformly distributed on the second housing, and aperture diameters of the plurality of ventilation holes range from 0.5 mm to 1.5 mm.

6. The sexual stimulation device according to claim 1, wherein the refrigeration and heating member is a semiconductor chilling plate, and the heat conducting member is an aluminum sheet or a copper sheet.

7. The sexual stimulation device according to claim 1, wherein the heat conducting member comprises a plurality of first components and a plurality of second components, the plurality of first components and the plurality of second components are intercrossedly arranged to form a mesh structure, and first deformation spaces for deformation of the flexible inner container are formed in the mesh structure.

8. The sexual stimulation device according to claim 1, wherein the heat conducting member comprises a first main body part in contact with the refrigeration and heating member and a second main body part not in contact with the refrigeration and heating member, the second main body part comprises a plurality of third components arranged at intervals along an outer periphery of the flexible inner container, and a second deformation space for deformation of the flexible inner container is formed between two adjacent third components among the plurality of third components.

9. The sexual stimulation device according to claim 8, further comprising a first vibration motor, wherein the first vibration motor is disposed in the second deformation space, and the first vibration motor drives the flexible inner container to vibrate.

10. The sexual stimulation device according to claim 8, further comprising a first airbag and a first air pump, wherein the first airbag communicates with the first air pump, the first airbag is disposed in the second deformation space, and the first air pump controls expansion or contraction of the first airbag to deform the flexible inner container.

11. The sexual stimulation device according to claim 1, wherein the flexible inner container comprises a first flexible main body part and a second flexible main body part sequentially arranged in a thickness direction of the flexible inner container, and a Shore hardness of the first flexible main body part is greater than a Shore hardness of the second flexible main body part.

12. The sexual stimulation device according to claim 1, wherein the flexible inner container is made of a flexible material, and the flexible material is one or more of a thermoplastic elastomer (TPE), a polyolefin elastomer (POE), silicone, and liquid silicone.

13. The sexual stimulation device according to claim 1, wherein the at least one massage structure includes a plurality of massage structures, the plurality of massage structures are arranged at intervals in a height direction of the flexible inner container, and each of the plurality of massage structures comprises a plurality of first protrusions arranged at intervals along an inner periphery of the flexible inner container.

14. The sexual stimulation device according to claim 1, wherein the at least one massage structure includes a plurality of massage structures, the plurality of massage structures are arranged at intervals in a height direction of the flexible inner container, and each of the plurality of massage structures comprises second protrusions extending uninterruptedly along an inner periphery of the flexible inner container.

15. The sexual stimulation device according to claim 1, wherein each of the at least one massage structure has a thickness of (T1), wherein 1 mm≤((T1)≤5 mm.

16. A sexual stimulation device, comprising:

a housing, wherein the housing comprises an accommodating cavity, and the accommodating cavity has a first opening;

a flexible inner container, wherein an end of the flexible inner container is provided with a second opening for insertion of a penis, an inner wall of the flexible inner container is provided with at least one massage structure, the at least one massage structure is configured to provide massage stimulation to the penis, the flexible inner container is disposed in the accommodating cavity, and a position of the second opening corresponds to a position of the first opening; the flexible inner container is provided with a first massage portion configured to be in contact with glans of the penis and a second massage portion configured to be not in contact with the glans of the penis; and a cold-heat generation assembly, wherein the cold-heat generation assembly comprises a heat conducting member and a refrigeration and heating member, the heat conducting member wraps an outer wall of the first massage portion, the heat conducting member is in contact with the outer wall of the first massage portion, and the refrigeration and heating member is in contact with a side of the heat conducting member away from the first massage portion; and at least one vibration motor, wherein the at least one vibration motor is disposed on an outer wall of the second massage portion; wherein the refrigeration and heating member performs heat exchange with the first massage portion through the heat conducting member until the first massage portion reaches a preset temperature, the preset temperature is a temperature required for the glans, and the at least one vibration motor drives the second massage portion to vibrate.

17. The sexual stimulation device according to claim 16, wherein the at least one vibration motor includes a plurality of vibration motors, wherein the plurality of vibration motors are uniformly arranged along an outer periphery of the second massage portion.

18. The sexual stimulation device according to claim 16, wherein the refrigeration and heating member is a semiconductor chilling plate, and the heat conducting member is an aluminum sheet or a copper sheet.

19. The sexual stimulation device according to claim 16, further comprising an air cooling assembly, wherein the air cooling assembly comprises a fan, a heat dissipation member, and an airflow channel, one end of the airflow channel communicates with the refrigeration and heating member, the other end of the airflow channel communicates with an exterior of the housing, the fan and the heat dissipation member are disposed in the airflow channel, one side of the heat dissipation member is connected to the refrigeration and heating member, and the other side of the heat dissipation member is connected to the fan.

20. The sexual stimulation device according to claim 19, wherein the housing comprises a first housing configured to be held by a user and a second housing configured to be not held by the user, the second housing is provided with a ventilation hole, and the ventilation hole communicates with the airflow channel.

* * * * *